May 11, 1954 R. BINDER 2,678,120
AUTOMATIC CLUTCH WEAR COMPENSATOR
Filed April 13, 1950 3 Sheets-Sheet 1
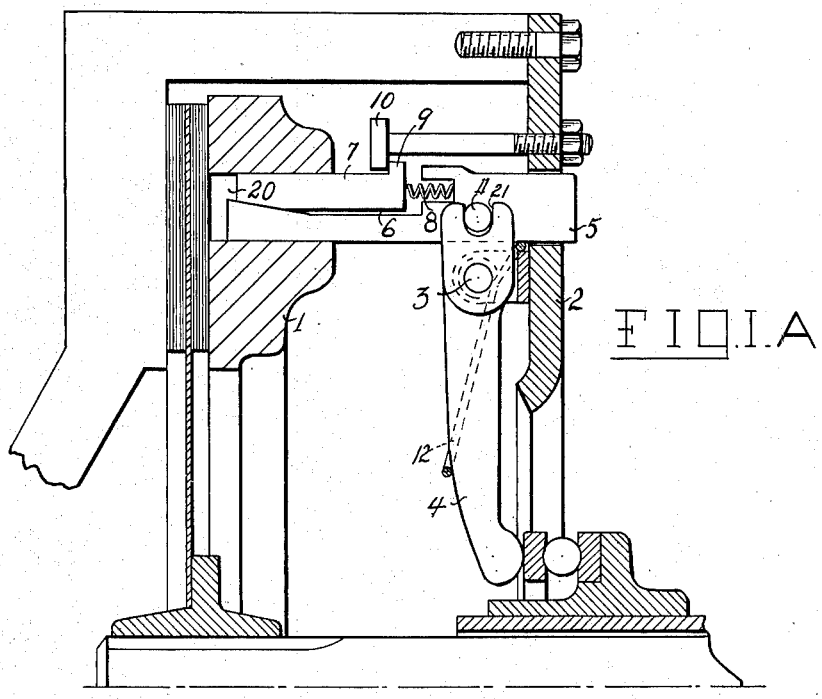
FIG.1.A
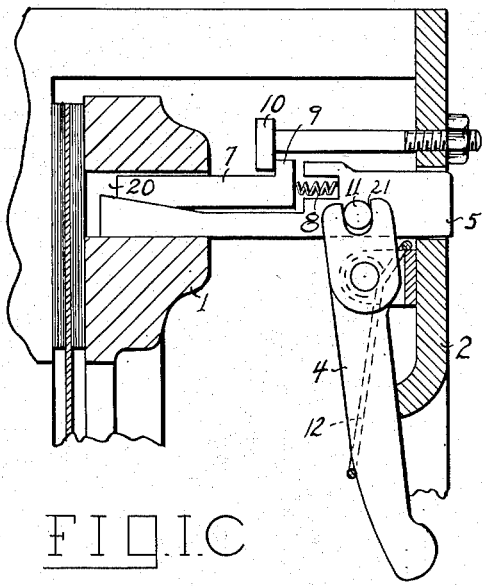
FIG.1.C
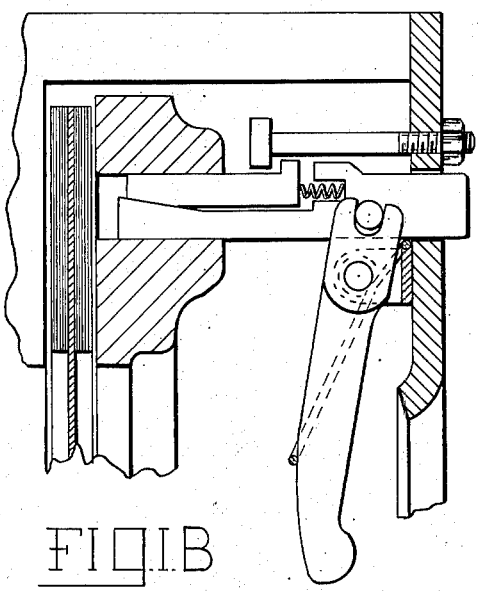
FIG.1.B
INVENTOR:
RICHARD BINDER
BY
Richardson, David and Nordon
ATTORNEYS

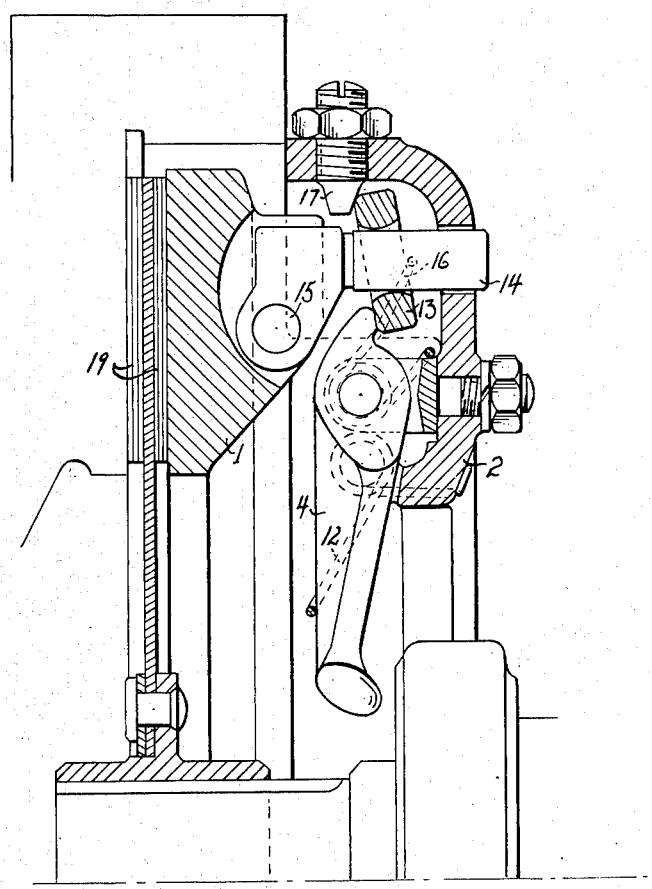
FIG. 2.A.

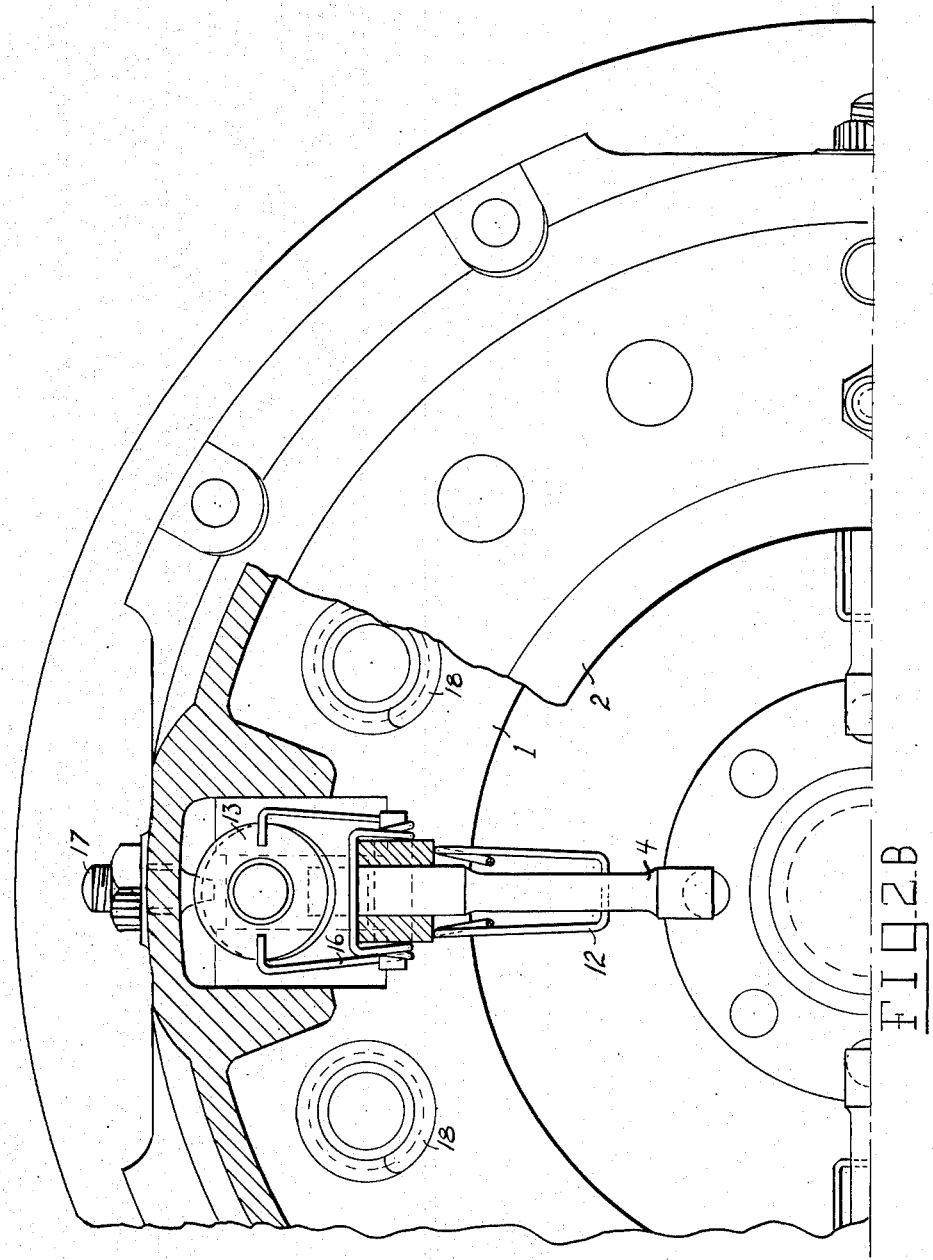

Patented May 11, 1954

2,678,120

UNITED STATES PATENT OFFICE 2,678,120

AUTOMATIC CLUTCH WEAR COMPENSATOR

Richard Binder, Schweinfurt, Germany

Application April 13, 1950, Serial No. 155,569

3 Claims. (Cl. 192—111)

The present invention relates to improvements in power transmission friction couplings such as are particularly useful as clutches on automobile vehicles.

Various proposals have been made with a view to compensating for wear on the friction surfaces of friction couplings and clutches. In certain cases adjustment elements have been disposed between the clutch plate and the clutch withdrawal levers, whilst in other cases the adjustment has taken place centrally. Clutches of small dimension have usually not been capable of variable adjustment.

In use, the effects of wear alter the thickness of the friction linings, and this has had to be compensated by an adjustment of the operating elements.

In the clutch or coupling of the present invention, the operating lever system is automatically adjustable, within fixed useful limits, when the position of the clutch plate alters, as takes place by wear on the friction linings or by assembly with a friction disc of a different thickness. In consequence, provision of an inward or outward adjustment, with consequent range of wear tolerance for the clutch withdrawal element, is no longer necessary and therefore the dimensions of the coupling can be reduced.

In the construction according to this invention, locking elements are disposed between the clutch levers and the clutch plate, which during the clutch withdrawal operation form a rigid connection between the levers and the clutch plate, but, however, free this connection when in the fully uncoupled position, so that a variation in position of the clutch plate has no effect on the position of the clutch lever.

The invention is further described with reference to the accompanying drawings, in which:

Figs. 1a, 1b and 1c show one form of construction of a clutch in sectional elevation in three different positions of the parts, Fig. 2a is a similar view of another form of construction, Fig. 2b is a part front view of the clutch, the enclosing plate of which is partly cut away.

According to the construction of Fig. 1a, the usual clutch springs are disposed between the clutch plate 1 and the cover plate 2, but are here not shown. They are, however, indicated in Fig. 2b. The clutch operating levers 4 can swing about pivots 3 on the cover plate 2 and serve in usual manner for the withdrawal of the clutch. The two-armed levers 4 are slotted at 21 on their short arms to engage the pins 11 of four-sided bolts or combination bolt-like members also capable of acting in a wedge-like manner 5 which are slidably displaceable within notches 20 of the clutch plate 1 and of the cover plate 2. The bolts 5 are cut away at 6 to form wedge surfaces. Displaceable wedge bars 7 rest in the cut away parts 6, which wedges lock the bolts 5 in the notches 20 of the clutch plate 1 by reason of the springs 8 abutting against the bolts 5. The wedges 7 are provided with projections 9 which engage against retaining bolts 10. The retaining bolts 10 are axially displaceable in the cover plate 2 and serve to limit the outer position of the wedges 7 relatively to the clutch plate 1.

Fig. 1a shows the clutch in the position in which the bolts or wedge-like bolt members 5 again take up engagement with the clutch pressure plate 1. The projections 9 engage the retaining bolts 10, but the bolt 5 is displaced so far to the right that the wedge 7 is still free, both on its inner wedge surface as also on the outer surface of the guide hole in the clutch plate 1.

As the bolts 5 are moved further to the right, the wedges under the action of the clutch springs become wedged between the bolts 5 and the clutch plate, so that by an appropriate selection of angle of the wedge surfaces, a secure locking is obtained between the clutch plate 1 and bolts 5, and thus also between the clutch plate 1 and levers 4. Fig. 1b shows the coupling in its fully coupled position.

The clutch-engaged position of the parts is shown in Fig. 1c. The lever 4 is brought into engagement against the cover plate 2 by means of torsion springs 12, and displaces pins 11, and thus bolts 5, against the clutch plate 1. As the wedge 7 with its projection 9 is already lying against the retaining bolts 10, as shown in Fig. 1a, the springs 8 are compressed, and in consequence the wedge engagement between the bolts 5 and the clutch plate 1 is released. In this position any wear of the friction surfaces has no effect on the position of the bolts 5, and thus on the combined lever system. The retaining bolts 10 are threaded in the cover plate 2 and are thus adjustable, and in the assembly of the clutch are so adjusted that a uniform freeing of the wedge connection of the locking elements disposed over the complete periphery of the clutch takes place, and therewith the freeing of the locking by the operating levers.

It is evident that the position of the wedge-like bolts 5 relatively to the clutch plate 1, and the degree of wear permissible can be adjusted, that is to say the bolts 5 are pulled out through the openings 20 by the amount of wear on the clutch linings, so that the initial and terminal position of the lever 4 will always be the same, and thus also its amount of withdrawal displacement.

In the form of construction according to Figs. 2a and b, the locking elements are in the form of annular locking rings 13 having cylindrical or ball-shaped openings. In order to obtain the wedge action, these wedge or locking rings are displaceable with some freedom along cylindrical bolts 14, which are capable of revolution with the clutch plate 1 about the shaft 15. The wedge rings also simultaneously serve as reaction surfaces for the clutch lever 4. Torsion springs 16 engage the wedge rings 13 and serve to bring about a connection between these and the bolts 14. The torsion springs 12 displace the levers 4 in the coupled position into engagement with the casing 2. Thus displacement in the uncoupled position is effected by means of screws 17 secured to the casing 2 and having conical ends against which the wedge rings abut, so that the engagement between these and the bolts 14 can be freed.

In operation, this construction functions as follows:

In the clutched position of the parts, as shown in Figs. 2a and 2b, the clutch lever 4 abuts against the casing due to action of the torsion springs 12. The torsion springs 16 thrust the wedge rings 13 against the lever 4 on the one hand, and on the other hand against the adjustable screws 17 which are so adjusted that play is allowed between the openings in the wedge rings 13 and the bolts 14, so that the connection between the levers 4 and the clutch plate 1 is freed, and the clutch plate 1 is pressed back under the action of the clutch springs 18 when wear takes place on the friction surfaces 19. When the parts are in the clutched or coupled position, the wedge rings 13, after moving a short distance, lockingly engage with the levers 4 by transmission of thrust through the bolts 14, so that the clutch plate 1 is freed from the clutch parts 19 by overcoming the pressure of the clutch springs 18.

The invention is not restricted to the particular type of locking elements described in the two constructions, but, moreover, is applicable to any type of locking element which will effect an automatic freeing of connection when the parts come into a predetermined position.

I claim:

1. A friction clutch comprising a rotary element, a clutch plate having an axial slot, friction surfaces on said rotary element and said clutch plate, a clutch operating member, a pair of wedge bars guided within said slot of said clutch plate, spring means forcing said wedge bars together and into driving engagement with said slot in said clutch plate, means connecting one of said wedge bars with said clutch operating member, an oppositely disposed stop engaging the other of said wedge bars to effect relative displacement of said wedge bars to bring the same out of driving engagement with said slot in said clutch plate in one direction of movement of said clutch plate and means for limiting the displaceability of said first wedge bar in the direction of disengagement.

2. A friction clutch comprising a rotary element, a clutch plate having an axial slot, friction surfaces on said rotary element and said clutch plate, a clutch operating member, a pair of wedge bars guided within said slot of said clutch plate, springs means forcing said wedge bars together and into driving engagement with said slot in said clutch plate, means connecting one of said wedge bars with said clutch operating member, an oppositely disposed adjustable stop engaging the other of said wedge bars to effect relative displacement of said wedge bars to bring the same out of driving engagement with said slot in said clutch plate in one direction of movement of said clutch plate and means for limiting the displaceability of said first wedge bar in the direction of disengagement.

3. A friction clutch comprising a clutch casing, a shaft, a clutch plate having an axial slot, friction surfaces on said casing and said clutch plate, clutch withdrawal members mounted on said clutch casing, a pair of wedge bars guided freely in said slot in said clutch plate, means connecting one of said wedge bars with said clutch withdrawal means, springs between said wedge bars forcing them into rigid engagement together and with said clutch plate, a stop on said clutch casing engaging the other of said wedge bars in a direction opposite to the direction of thrust of said springs between said wedge bars, and means for limiting the displaceability of said first wedge bar in the direction of disengagement.

References Cited in the file of this patent

UNITED STATES PATENTS

| Number | Name | Date |
| --- | --- | --- |
| 1,755,829 | Loughead | Apr. 22, 1930 |
| 2,057,802 | Tatter | Oct. 20, 1936 |
| 2,057,803 | Tatter | Oct. 20, 1936 |
| 2,183,668 | Burkhardt | Dec. 19, 1939 |
| 2,276,206 | Klane | Mar. 10, 1942 |
| 2,386,913 | Sawtelle | Oct. 16, 1945 |
| 2,417,476 | Finlay | Mar. 18, 1947 |
| 2,421,869 | Brock | July 10, 1947 |
| 2,562,613 | Halberg | July 31, 1951 |
| 2,583,970 | Schultz | Jan. 29, 1952 |
| 2,616,540 | Miller | Nov. 4, 1952 |